June 1, 1965  L. V. PFAENDER  3,186,813
FORMING THIN GLASS FOIL
Filed Aug. 17. 1961  4 Sheets-Sheet 1
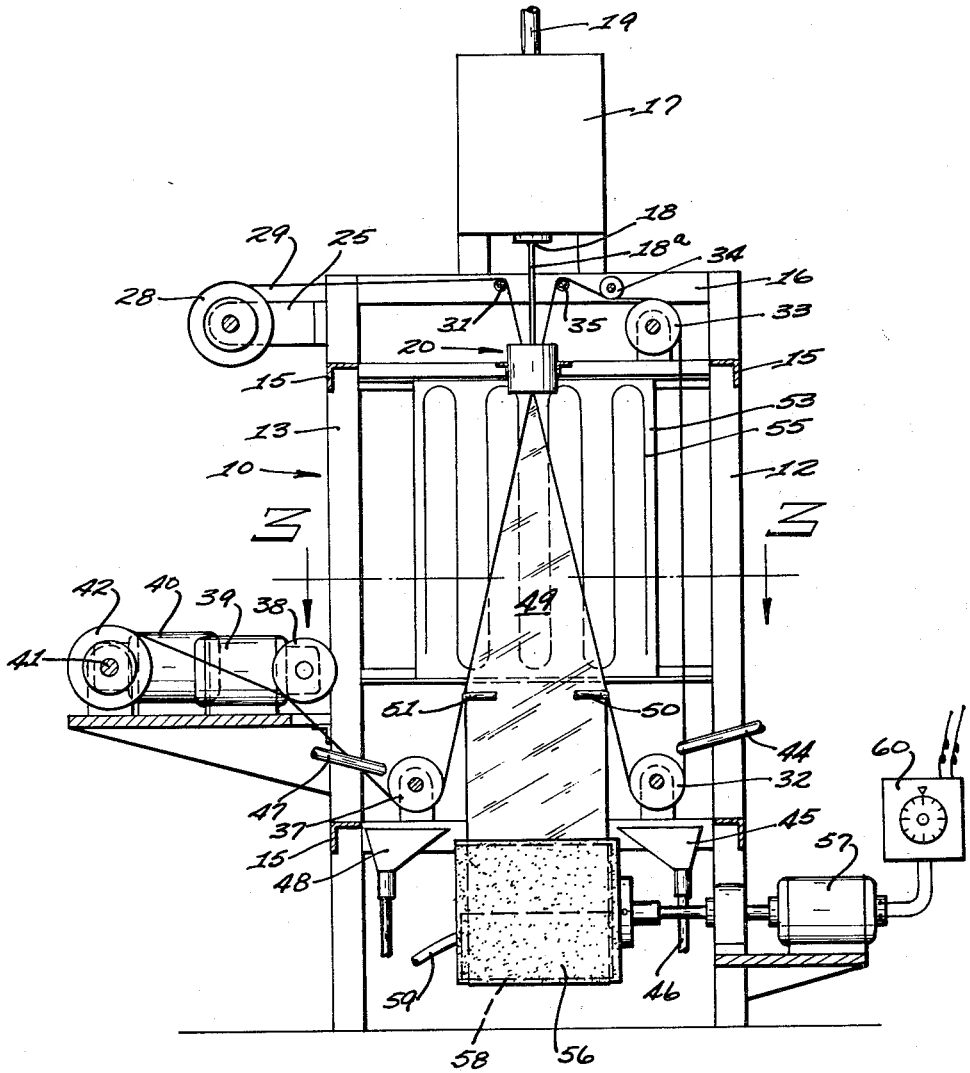
INVENTOR.
LAWRENCE V. PFAENDER
BY
J. T. Innis &
W. A. Schaich
ATTORNEYS June 1, 1965     L. V. PFAENDER     3,186,813
FORMING THIN GLASS FOIL
Filed Aug. 17, 1961     4 Sheets-Sheet 2
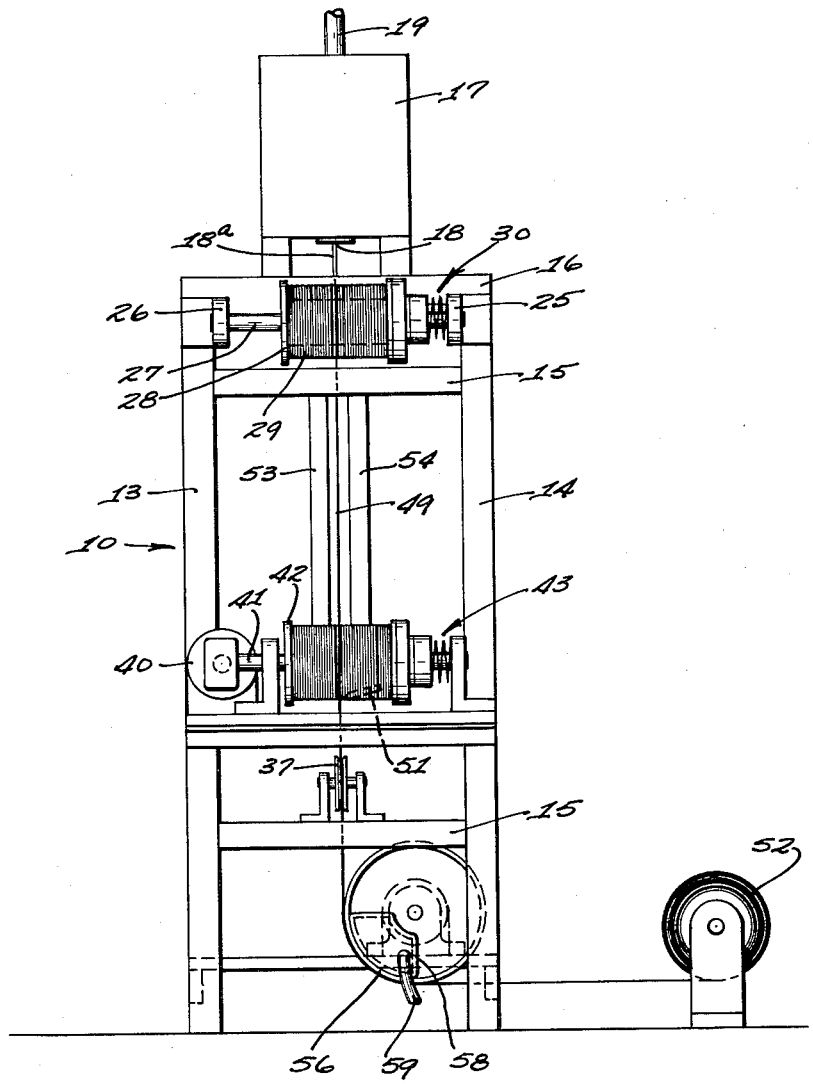
INVENTOR.
LAWRENCE V. PFAENDER
BY
    ATTORNEYS June 1, 1965  L. V. PFAENDER  3,186,813
FORMING THIN GLASS FOIL
Filed Aug. 17. 1961  4 Sheets-Sheet 3
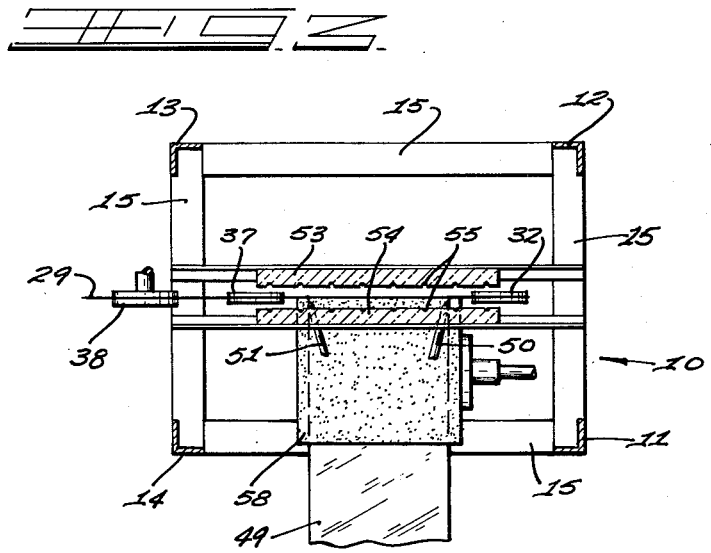
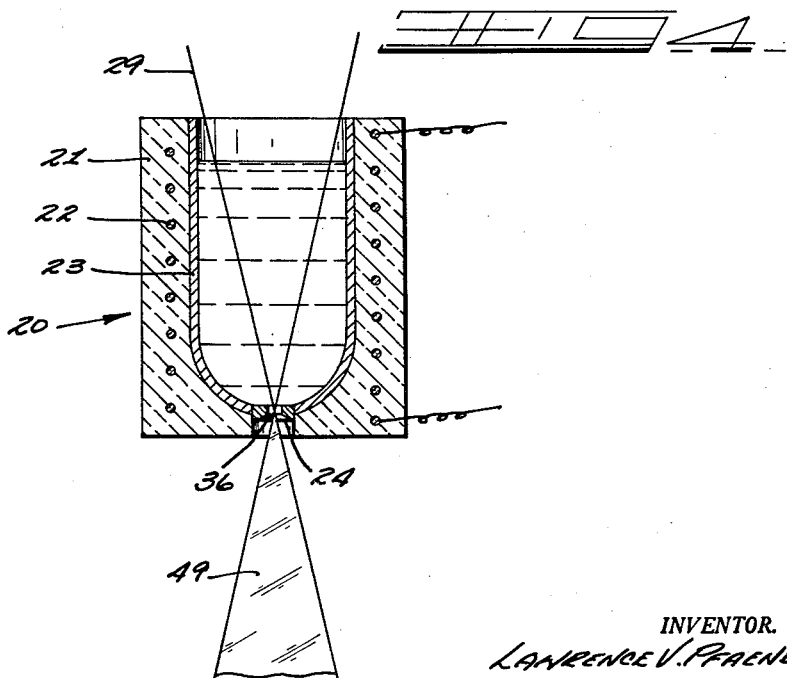
INVENTOR.
LAWRENCE V. PFAENDER
BY
ATTORNEYS

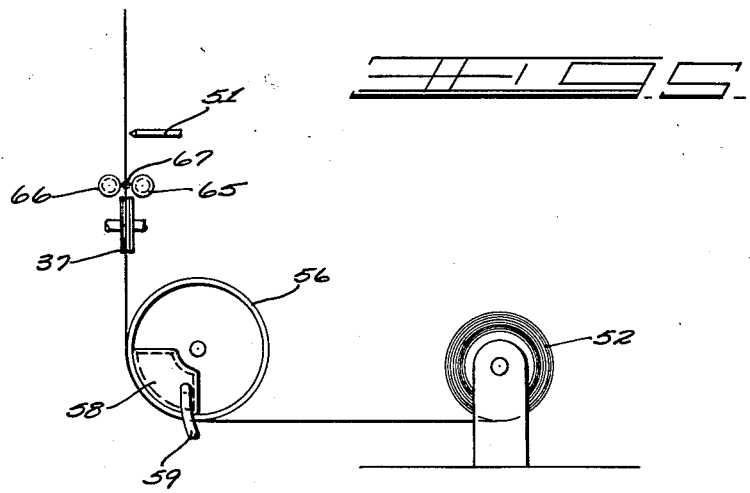
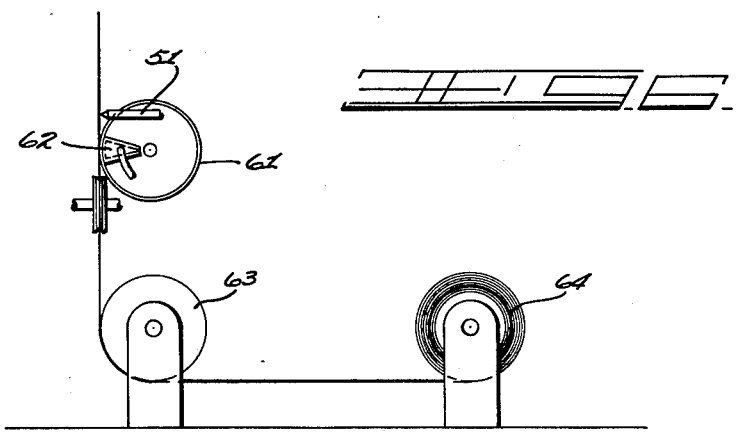
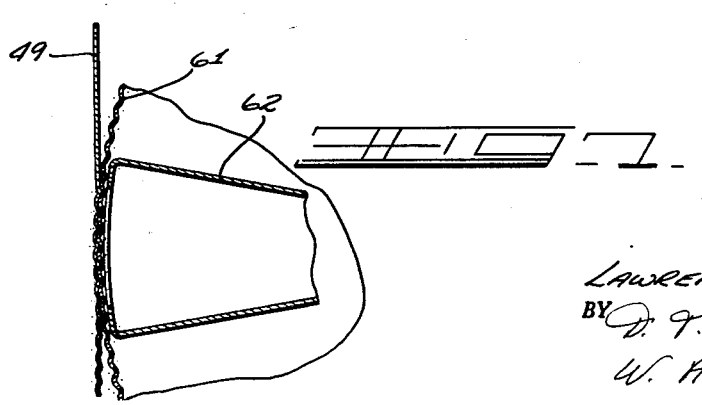
INVENTOR.
LAWRENCE V. PFAENDER
BY
ATTORNEYS

United States Patent Office  3,186,813  
Patented June 1, 1965

3,186,813  
FORMING THIN GLASS FOIL  
Lawrence V. Pfaender, Toledo, Ohio, assignor to Owens-Illinois Glass Company, a corporation of Ohio  
Filed Aug. 17, 1961, Ser. No. 132,098  
8 Claims. (Cl. 65—90)

This application relates to a method of and apparatus for continuously forming a glass sheet and is particularly concerned with an improved method and apparatus for producing extremely thin sheet glass or foil of uniform thickness. An extremely thin glass sheet has utility as insulation for electrical apparatus and when laminated with thermosetting plastics, provides a material having improved structural strength and thermal characteristics. Glass foils of very low thickness are very flexible and are characterized by excellent insulating properties.

A prior art apparatus for forming glass foil is disclosed in U.S. Pat. No. 2,986,843 to S. A. Loukomsky issued June 6, 1961 and involves drawing a pair of endless carriers through an opening in the bottom of a glass reservoir in a divergent direction and forming a film of glass between the diverging members.

There are serious drawbacks in the arrangement disclosed by Loukomsky, one of which is that by using endless wires, the expected life of the apparatus, before it would be necessary to replace the wires, is relatively short because molten glass will corrosively attack the wires at rates that may be extremely rapid depending on the glass composition. The extensive heating and intermittent cooling of the wire by Loukomsky will cause crystal growth, sometimes called "thermal embrittlement," throughout the wires' cross-section. Depending upon wire material employed, this embrittlement will be responsible for considerable wire failure. If the wires are not formed of a noble metal, excessive oxidation will also occur and result in glass contamination. This condition is, of course, aggravated and more serious when glass carriers are continually recycled. When the softer noble metals are employed rapid elongation of wires then occurs, reducing the cross-section and increasing the length of the wires, again making endless glass carriers a source of difficulty.

Applicant has found that in operating a device similar to the device disclosed in the above-referred-to Loukomsky patent it is impossible to form thin glass film of a substantial width that is free of wrinkles or lateral waves in the film. Wrinkles or lateral waves in the film will be formed by the operation of the device of Loukomsky due primarily to the fact that he does not provide a heated atmosphere in the operating zone and also due to the fact that he does not apply any longitudinal tension to the film itself except as a component of force applied by the diverging wires. It can readily be seen by insepecting glass film produced by means of divering wires, that the most effective force responsible for thinning the film is the horizontal component of the wire tension. Due to the application of this horizontal force on the film as it is being thinned and the fact that portions of the film will, as a practical matter, be chilled more than others due to air current and other nonuniformities in the atmosphere surounding the forming film, lateral waves or wrinkles will be formed in the glass film.

Applicant has found that seeds and other glass film contamination is a serious liability associated with producing glass film by diverging wires. Only by using clean, glass-free wire can film of the most uniform surface characteristics be formed.

With the foregoing in mind, it is an object of this invention to provide a method of forming thin glass sheets that are flat throughout their width.

It is an additional object of this invention to form extremely thin glass sheets of substantial width greater than has been heretofore obtainable and free of seeds or other film irregularities.

It is a further object of this invention to provide a method and apparatus for forming thin glass sheets having a protective coating applied thereto.

A further object of this invention is to provide apparatus for forming a continuous thin glass sheet which is operable for an indefinite period of time without breakdown.

A further object of this invention is to provide apparatus for drawing a continuous extremely thin glass sheet having a flat surface and having a selectively variable thickness.

An additional object of this invention is to provide a method and apparatus for forming an extremely thin, continuous sheet of glass into predetermined physical configurations.

It is a still further object of this invention to provide a method of drawing a continuous glass sheet of selectively variable thickness and of selectively variable width.

Other and further objects will be apparent from the following description taken in conjunction with the attached sheets of drawings wherein:

FIG. 1 is a schematic front elevational view of the film forming apparatus of the invention.

FIG. 2 is a left-side elevation of the apparatus of FIG. 1.

FIG. 3 is a cross-sectional view taken at line 3—3 on FIG. 1.

FIG. 4 is an enlarged detailed view of the chamber or pot from which the molten glass is being drawn.

FIG. 5 is a schematic side elevational view of a modification of the device of FIG. 1 illustrating the manner of applying a coating to the film as it is being formed.

FIG. 6 is a schematic side elevational view of a second embodiment of the invention wherein slight corrugations are formed in the glass film.

FIG. 7 is an enlarged sectional view of a portion of the corrugating drum of FIG. 6 shown in cooperation with the glass sheet being formed.

Referring now to FIGS. 1 to 3, the apparatus of the invention comprises a base 10 in the form of four upright members 11, 12, 13 and 14 joined together near the bottom and top thereof by a plurality of horizontal members 15. The tops of the members 11 to 14 are also joined together by a horizontal platform 16. The platform 16 serves as the supporting member for a glass melting chamber 17. The chamber 17 is provided with an orifice 18 in the bottom thereof which may be opened and closed by a vertically shiftable valve body 19 in the form of a plunger which is adapted to cooperate with the inner surface of the orifice 18 to block or control the rate of glass flow out of the orifice. Vertically below the orifice 18 is positioned a chamber or pot 20. The melting chamber 17 is provided with suitable heating means, not shown, so as to provide a supply of molten glass for the pot 20.

As the glass issues in a continuous stream 18a from the orifice 18, it will fall through the open top of the chamber or pot 20, the details of which are shown in FIG. 4. The pot 20 is formed of a heat-resistant ceramic material 21 with heating coils 22 embedded therein in surrounding relationship with respect to a platinum liner 23 which forms the internal surface of the pot 20.

An orifice member 24 is formed in the bottom of the ceramic pot 20 and is in communication with the interior of the chamber formed by the platinum liner. The orifice member 24 has a relatively small opening therethrough which controls the amount of glass which will issue therefrom and be formed into a sheet or foil. The primary function of the heating coils 22 is to maintain the glass contained within the pot 20 at a constant uniform temperature during the operation of the glass forming device.

Furthermore, by having the heating coils embedded in the ceramic 21 of pot 20 and having the pot 20 separate from the melting chamber 17, easy access is provided for rethreading the wires through the orifice member 24 in the event of breakdown.

A pair of spaced horizontally extending bearing supports 25 and 26 are connected to the base 10 adjacent the top thereof and serve as the support for a horizontal shaft 27. The shaft 27 supports a spool 28 having a plurality of turns of wire 29 wrapped thereon. Rotation of the spool 28 with respect to the shaft 27 is resisted by a spring clutch mechanism 30. The wire 29 extends from the spool 28 and is guided by a roller 31 positioned above the pot 20 and laterally displaced from the axis thereof. Wire 29 then extends down through the pot and out through the orifice 24 formed in the bottom thereof and passes beneath a pulley 32 which is mounted for rotation about a horizontal axis adjacent to the bottom of the base 10. The wire 29 extends from beneath the pulley 32 in a vertical direction and passes over a second pulley 33 which is mounted adjacent the top of the base 10.

After passing over pulley 33, the wire 29 will pass under a pulley 34 and over a second roller 35 which is positioned above the pot 20 and displaced from the vertical axis of the pot an amount substantially equal to the displacement of the first roller 31 but on the diametrically opposed side of said pot axis. The wire 29 continues downwardly through the pot 20 out through the orifice 24 and passes itself at a point 36, which initially is above the bottom of the orifice 24, then continues downward to a third pulley 37 which is mounted for rotation with respect to the base 10 in substantially the same horizontal plane as the previously mentioned first pulley. After passing under the pulley 37, the wire 29 makes one complete turn around a fourth pulley 38. This fourth pulley 38 is driven by a variable speed motor 39. The motor 39 serves as the means for drawing the wire from the supply spool 28 and through the pot 20 twice. A second motor 40 is adapted to rotate shaft 41 which is coupled to a take-up spool 42 by means of a second spring clutch 43. Thus the motor 40 maintains the wire 29 tightly looped about the pulley 38 so that rotation of the pulley 38 will draw the wire 29 through the apparatus at a controlled speed. Additionally, the wire 29 is maintained under predetermined tension by the firstmentioned spring clutch 30 which is resisting the rotation of the supply spool 28.

Inasmuch as the wire 29 will be heated during its first passage through the pot 20, it is necessary that the wire be cooled before its second passage therethrough. Also it is necessary to remove any glass which will be adhering to the wire prior to its second trip through the pot 20. To accomplish these purposes, applicant provides a supply of water through a nozzle 44 which is directed to impinge on the pulley 32. Below the pulley 32 is a funnel 45 which will collect the water from the pulley 32. The funnel 45 has a drain pipe 46 connected thereto for carrying the water off to a suitable drain. In this manner applicant cools the wire 29 and any glass adhering thereto will be solidified. After the wire 29 passes over the second pulley 33, its linear direction is changed by the pulley 34. This change of direction causes the solidified glass thereon to be cracked from the wire, thus when the wire passes over the second roller 35, it is free of any adhering glass.

After the wire has passed through the pot 20 for the second time, it is cooled in substantially the same manner as previously described with respect to the cooling effected at pulley 32, by a flow of water from a nozzle 47 impinging on the pulley 37. A discharge funnel 48 is positioned below the pulley 37 and will carry the water away from the machine to a suitable drain. As the wire 29 is drawn through the pot 20, the molten glass contained therein will adhere to the wire 29 and in view of the surface tension of the glass and the fact that the two portions of the wire are continuously moving in divergent directions, a glass film 49 will be formed between the diverging portions of the wire 29. The area between the portions of wire below the pot 20 is defined as the spreading zone.

It has been observed that as the wires first leave the pot 20 in their downward direction, they have a considerable amount of molten glass thereon but by the time they have traversed the height of the spreading zone, there is considerably less glass still retained on the wire. It thus appears that the wire acts as continuously moving reservoirs for the molten glass that forms the film or foil 49. The glass film 49 is removed from the wire by a pair of torches 50 and 51 which direct small flames against the film or foil adjacent the wires thus severing the film from the wire. While applicant has disclosed that the film may be severed from the wire by the use of torches it should be pointed out that other means, for example, electric arc cutting or mechanical shearing, could likewise be employed.

After the glass film 49 has been separated or severed from the wire 29, it moves vertically downward into contact with the periphery of the drum 56 in a plane tangent to the surface of the drum. The drum 56 has a porous surface and is adapted to be rotated about a horizontal axis by a motor 57 connected thereto. A vacuum chamber 58, having a width equal to the width of the drum, is positioned within the drum with its open face in close proximity to the porous surface of the drum 56 and encompassing approximately 90° of the circumference of the drum. A pipe 59, connected to a suitable source of vacuum, is connected to the interior of the chamber 58.

Thus it can be seen that as the film approaches the surface of the drum 56, it will be held against the drum surface by the vacuum chamber 58 and will be maintained against the drum surface through a 90° arc. When the film reaches the bottom of the drum 56, it will be released from the drum surface and will continue in a generally horizontal direction and be collected on a spool or roller 52, which may be driven in synchronism with and at substantially the same rate as the drum 56.

The motor 57 which drives the drum 56 is an electric motor connected to a suitable source of alternating current and having in series with this conection, a Variac motor speed control 60 described at pages 221, 222, and 223 of the General Radio Company, Catalogue Q, published May 1961. The control 60 serves as a means for regulating the rotational velocity of the drum 56 and is calibrated in film thickness units. The motor 57 rotates the drum 56 at a velocity greater than the rate at which the film is being formed by the wire 29. In other words, the peripheral velocity of the drum 56 is always greater than the normal linear velocity of the formed film as it is severed from the wire 29. Thus it can be seen that the differential velocity of the moving film and the drum periphery will result in the application of longitudinal stress or tension to the film after it has been separated from the wire 29. By adjusting the rate of rotation of the drum applicant is able to vary the thickness of the film after it has been severed from the wire 29. The film 49, after being severed from the wire, is still in a somewhat plastic state so that the application of tension in a direction parallel to its travel will stretch the film and result in the production of a film which is thinner than it would normally be without the application of this force.

Obviously the speed with which the motor 57 rotates the drum 56 will be determinative of the thickness of the ultimate glass film being produced by this simple expedient regulate the thickness of the film.

This additional stretching of the film also aids in preventing the formation of waves in the film which will normally be present due to the stress embodied in the film during the stretching thereof in the lateral direction by the wire 29 as it passes through the spreading zone.

During the formation of the film 49, or "foil" as it is sometimes termed, it is necessary that the temperature of the film in the spreading zone be maintained at an elevated level so that the foil will not set up until it has spread to a considerable width. In fact, the system cannot operate in a trouble-free manner unless careful control of the temperature conditions of the atmosphere surrounding the film are maintained. If the viscosity of the film increases before servering to the extent that the tension in the wires is not capable of stretching the film, waves and irregularities in the dimensions of the film will occur and the wires will no longer perform their functions of drawing a uniform film.

With this in view, applicant provides a pair of flat, surface heaters 53 and 54 which extend vertically on either side of the spreading zone and thus provide a blanket of heat surrounding the film 49. These heaters may take any conventional form. For example, as shown in the drawings, these heaters are formed of ceramic material having electric resistance wires 55 in their surfaces and by connecting the wires to a suitable source of electric current, they will be heated.

Obviously the amount of current being supplied to the heater wires 55 may be controlled in a conventional manner so as to provide a heated zone of predetermined temperature in surrounding relationship with respect to the film or foil 49 as it is being formed in the spreading zone.

It should be pointed out that while applicant has described the heating elements utilized in this device as being electrical, it would be feasible and sometimes advantageous to use radiant gas burners to provide heat for the melting chamber or for the blanket of heat surrounding the spreading zone.

In the operation of the device described, the motors 39 and 40 are energized and the wire 29 will be continuously drawn through the apparatus, thus continuously forming a film 49 of glass in the spreading zone. As the glass is drawn from the pot 20 by the movement of wire therethrough, it is replenished by the flow of molten glass from the melting chamber 17. The temperature controls which may be provided in the apparatus, for example, for controlling the temperature of the heaters 53 and 54 and the temperature of the pot 20 may be conventional in form, it being understood that the positioning of thermocouples or other temperature sensing devices in suitable temperature sensing locations and their utilization for controlling the amount of current being delivered to the electrical resistance heater elements is conventional and thus it is not necessary that their details be described.

As an example of a successful operation of the invention and to illustrate the conditions present in one situation, a glass having the following composition:

*A high lead glass*

| | Percent |
|---|---|
| $SiO_2$—silica | 34.82 |
| $K_2O$—potassium oxide | 6.11 |
| PbO—lead oxide | 58.66 |
| $Sb_2O_3$—antimonate | .41 | was initially heated in the melting chamber 17 to a temperature of 2025° F. The pot 20 was maintained at a temperature of 1600° F. and the temperature in the spreading zone was maintained at 1200° F. With these conditions maintained, film or foil 49 was produced at the linear velocity of 28 to 32 feet per minute with a thickness range of 1.5 to 1 mil.

Thus it can be seen that applicant has provided a method and apparatus for drawing a continuous foil, sheet or film of extremely thin glass of uniform cross-section. By adjusting the rate at which the drum 56 is rotated, it is possible to adjust the thickness of the film as it is being drawn and thus films of varied thickness may be alternately drawn in a continuous manner by the apparatus described above. Adjustment of the foil thickness is also possible by regulating the temperature and thus the viscosity of the glass. However, it is more satisfactory to regulate the drawing rate and in this manner, applicant has formed films having thickness in the range of 0.3 to 5 mils which have uniform thickness throughout their width.

It should be pointed out that the uniformity of the thickness of the film throughout its width is attributed to the technique of operating the system up to the time when the film is severed from the wires. After the film is severed from the wires, the thickness of the film is controlled by the application of the longitudinal force to the film by the drum 56.

As has been previously set forth, after the film is severed from the guide wires, the application of a longitudinal, or in this case a downward, force to the film will result in stretching the film until the film has become sufficiently cooled to no longer be plastic. In actual practice when drawing a film of 6" width, there is approximately a 2" long zone after the cut-off in which the film remains plastic. It is within this 2" zone that all of the thinning of the film takes place and as a matter of actual fact, it has been experienced that the film can be reduced at least to one-half of its original thickness.

While applicant has disclosed a rotating drum and vacuum chamber as a specific arrangement for applying tension to the film, it should be made clear that other means could be employed for this purpose. For example, a static charge could be applied to the drum which would attract the film and hold it against the drum in place of the vacuum chamber shown. Also, a linearly moving endless porous member could be utilized in place of the drum and the film adhered thereto by the application of a vacuum or by a static charge.

Referring now to FIG. 5, applicant shows a schematic arrangement for applying a protective coating to the film as it is being formed in a continuous manner. An example of a material which has been used as a coating for giving the film an improved surface lubricity, is a polyethylene wax emulsion in water of the type disclosed in U.S. Pat. No. 2,995,533, dated August 8, 1961. The coating is applied to the film as it is being drawn where there is still considerable heat retained by the film so that the film will be dry at the time it comes in contact with the drum 56. As shown in FIG. 5, the coating is applied by means of a pair of pipes 65 and 66 which are positioned on opposite sides of the film and extend the full width of the film. Each of the pipes 65 and 66 carries a plurality of longitudinally spaced spray nozzles 67 which have their outlets facing in the direction of the sheet of glass. In this manner a quantity of coating may be sprayed on the film as it is moving from the cut-off area to the drum 56. The film, after passing beneath the drum 56, may be stored on a take-up roller in the same manner as described with respect to the embodiment shown in FIGS. 1 to 3.

In some instances it is desirable to form a film of glass which is extremely thin but having specific shapes, for example, transverse corrugations of specific dimensions and at specific intervals in the length of the sheet. With specific reference to FIGS. 6 and 7, there is shown an arrangement for applying corrugations to the film being formed by the use of a drum 61 which has a corrugated surface (see FIG. 7) and is adapted to contact the glass film before the glass has become completely frozen or set up. Thus the drum 61 is mounted closer to the burners or cut-off devices 50 and 51 than the drum 56 in the previously described embodiment. Within the drum 61 there is mounted a chamber 62 having an open face in close proximity to the inner surface of the drum. The chamber 61 is connected to a source of vacuum.

It should be noted that the open face of the chamber 62 underlies a considerably less arc of the drum 61 than the open face of the previously described vacuum chamber 58. This is necessary for the reason that the film, when it is drawn into contact with the drum 61, is still in a plastic state thus to prevent applying a permanent curvature to the film, it is necessary that it contact the drum and be moved thereby through a relatively short arc. After contacting the drum the corrugated film will move vertically downward and pass beneath an idler roll 63 and then be wound up on the storage roll 64. The storage roll 64 may be driven in synchronism with the drum 61 but is initially slightly out of phase therewith so that no tension will be applied to the corrugated film by rotation of the storage roll 64. The only tension applied to the film and consequent thinning of the film is accomplished by the rotational speed of the drum 61.

Therefore, it can be seen that applicant has provided an arrangement for forming extremely thin sheets of glass having regular and controllable physical characteristics.

Obviously the rate of rotation of the drum 61 may be regulated in the same manner as the speed of rotation of the drum 56. While applicant has described a method and apparatus for producing extremely thin glass sheets having corrugations, it should be apparent that other configurations than corrugation could be applied to the film in a continuous manner. This could be done by using a drum similar to that shown at 61 which will have an outer peripheral surface containing the configuration to which the film will conform and provide permanent impressions in the glass film. Alternatively, a linearly driven member having an irregular surface could be utilized.

Various modifications may be resorted to within the spirit and scope of the appended claims.

I claim:

1. In a method of forming a continuous glass foil from a reservoir of molten glass wherein a pair of glass wettable members are continuously moved out of said melt in diverging directions to form a foil of glass between the divergent portions of said members and the formed foil is separated from the members at a selected distance from the melt depending upon the width of foil desired, the improvement comprising continuously stretching said foil by applying force thereto in a direction parallel to its length after separation from said members.

2. The method as set forth in claim 1 including the additional step of shaping said glass foil while in a plastic state concurrently with the application of the tensile force thereto.

3. Apparatus for forming continuous glass foil comprising a heated chamber, means for feeding molten glass to said chamber, a spool of wire mounted adjacent said chamber, an orifice formed in the bottom of said chamber, a continuous, heat-resistant wire extending from said spool through said chamber and out through said orifice at an angle to the vertical axis of said chamber, said wire further extending a substantial distance below said chamber, returning to a point above said chamber, and extending back through said chamber and orifice at an angle to the axis of said chamber which is equal to said first mentioned angle but at a diametrically opposed side of said chamber, a take-up spool to which said wire is connected, drive means for rotating said take-up spool for drawing said wire through said chamber at a preselected speed and means to sever the formed foil from the wire adjacent its point of lowest travel.

4. The apparatus as defined in claim 3 further including means engaging said wire for maintaining said wire under predetermined tension throughout its travel through said apparatus.

5. The apparatus as defined in claim 3 further including driven means for engaging said foil for applying a preselected tension to said foil after it has been severed from said wire, and adjustable means for driving said foil engaging means, whereby the thickness of said foil is varied.

6. Apparatus for forming a continuous glass foil comprising a glass melting chamber, said chamber having an opening in the bottom thereof, a pair of glass wettable, flexible members extending generally vertically through said chamber and out said orifice, said members being spaced apart as they enter the top of said chamber, cross each other within or above said orifice, are spaced apart below said orifice and extend a substantial distance below said orifice, means for driving said flexible members in a downward direction at a controlled linear speed, whereby a thin glass foil is formed between said members below said orifice, means for separating said foil from said flexible members, a drum having a porous surface positioned beneath and in engagement with the separated foil, means for applying a vacuum to the interior of said drum along an arc of its circumference, said arc being coincident with the area of contact of the foil with the drum, and means for driving said drum at a peripheral speed greater than the lineal speed of formation of said foil whereby a constant tension is allied to said foil.

7. The apparatus as defined in claim 6 wherein said drum has a corrugated surface, means mounting said drum for rotation with its periphery tangential to the foil adjacent the area of severing of the foil and engages the foil while it is still in a plastic condition; and said vacuum is applied to the drum through a short arc of its circumference at the point of tangency.

8. The apparatus as defined in claim 6 further including means for regulating the speed of said driving means whereby variable tensile force is applied to said foil to produce foils of selective thickness.

References Cited by the Examiner
UNITED STATES PATENTS

| | | | |
|---|---|---|---|
| 2,457,785 | 12/48 | Slayter et al. | 65—181 |
| 2,780,889 | 2/57 | Fulk | 65—227 |
| 2,986,843 | 6/61 | Loukomsky | 65—193 |
| 3,021,227 | 2/62 | Richardson | 65—60 X |

FOREIGN PATENTS 283,695   10/52   Switzerland.

DONALL H. SYLVESTER, *Primary Examiner.*